(12) United States Patent
Lo

(10) Patent No.: US 8,941,573 B2
(45) Date of Patent: Jan. 27, 2015

(54) LIQUID CRYSTAL DISPLAY PANEL AND LIQUID CRYSTAL DISPLAY DEVICE

(75) Inventor: Shih-hsun Lo, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 258 days.

(21) Appl. No.: 13/578,616

(22) PCT Filed: Jul. 26, 2012

(86) PCT No.: PCT/CN2012/079183
§ 371 (c)(1),
(2), (4) Date: Aug. 11, 2012

(87) PCT Pub. No.: WO2014/015494
PCT Pub. Date: Jan. 30, 2014

(65) Prior Publication Data
US 2014/0028536 A1 Jan. 30, 2014

(30) Foreign Application Priority Data

Jul. 24, 2012 (CN) .......................... 2012 1 0257814

(51) Int. Cl.
G09G 3/36 (2006.01)

(52) U.S. Cl.
USPC .......................................................... 345/92

(58) Field of Classification Search
CPC combination set(s) only.
See application file for complete search history.

(56) References Cited

U.S. PATENT DOCUMENTS

| 3,958,079 | A | * | 5/1976 | Case et al. | 348/325 |
| 5,648,674 | A | * | 7/1997 | Weisfield et al. | 257/428 |
| 6,297,862 | B1 | * | 10/2001 | Murade | 349/44 |
| 7,932,519 | B1 | * | 4/2011 | Liu | 257/59 |
| 7,944,514 | B2 | * | 5/2011 | Ohara et al. | 349/46 |
| 2013/0292679 | A1 | * | 11/2013 | Arasawa et al. | 257/59 |
| 2014/0028536 | A1 | * | 1/2014 | Lo | 345/92 |

* cited by examiner

Primary Examiner — Van Chow
(74) Attorney, Agent, or Firm — Andrew C. Cheng

(57) ABSTRACT

The present invention provides a liquid crystal display panel and liquid crystal display device, which includes data lines, scan lines disposed in a crisscross manner with data lines, pixel electrode disposed within area formed by two adjacent scan lines and two adjacent data lines, and thin film transistor disposed at intersection points of data line and scan line; wherein drain terminal of thin film transistor having extension part acting as repair line for scan line, extension part extending along direction parallel to scan line and an end of extension part away from thin film transistor partially overlapping scan line.

8 Claims, 4 Drawing Sheets

LIQUID CRYSTAL DISPLAY PANEL AND LIQUID CRYSTAL DISPLAY DEVICE

BACKGROUND OF THE INVENTION

1. Field of the Invention

The present invention relates to the field of liquid crystal displaying techniques, and in particular to a liquid crystal display panel and liquid crystal display device.

2. The Related Arts

As liquid crystal displaying techniques undergo fast development, due to the advantages of high resolution, reduced thickness, light weight, and low power consumption, the liquid crystal display devices find wide applications in many application fields. A known liquid crystal display device comprises a liquid crystal display panel and a backlight module. The liquid crystal display panel comprises a plurality of pixel units, arranged in an array format, with each of pixel units further comprising R, G, B sub-pixel units.

Referring to FIG. 1, FIG. 1 is a schematic view showing the structure of a pixel unit of a known liquid crystal display panel. To save cost, R, G, B sub-pixel units of pixel unit 10 are arranged as tri-gate pixel. As such, number of scan lines 12 increases and the probability of broken lines in scan lines 12 also increases. If more scan lines 12 are broken, the yield rate decreases and the manufacturing cost increases.

Thus, it is desired to have a liquid crystal display panel and liquid crystal display device that overcomes the above problems.

SUMMARY OF THE INVENTION

The technical issue to be addressed by the present invention is to provide a liquid crystal display panel and liquid crystal display device, convenient for scan line repair so as to improve yield arte and reduce manufacturing cost.

The present invention provides a liquid crystal display panel, which comprises: data lines, scan lines disposed in a crisscross manner with data lines, pixel electrode disposed within area formed by two adjacent scan lines and two adjacent data lines, and thin film transistor disposed at intersection points of data line and scan line; gate terminal of thin film transistor connected to scan line, source terminal of thin film transistor connected to data line and drain terminal of thin film transistor connected to pixel electrode, wherein long side of pixel electrode being disposed in parallel with scan line, drain terminal of thin film transistor having extension part acting as repair line for scan line, extension part extending along direction parallel to scan line and an end of extension part away from thin film transistor partially overlapping scan line, extension part comprising a main part disposed in parallel with scan line and a bending part connected to an end of the main part away from thin film transistor, and the bending part extending towards scan line and partially overlapping scan line; alternatively, scan line being disposed with a bump part at an end close to extension part away from thin film transistor, the bump part extending towards extension part and partially overlapping end part of extension part.

According to a preferred embodiment of the present invention, the bending part is connected to the main part perpendicularly.

According to a preferred embodiment of the present invention, the bump part is connected to the scan line perpendicularly.

The present invention provides a liquid crystal display panel, which comprises: data lines, scan lines disposed in a crisscross manner with data lines, pixel electrode disposed within area formed by two adjacent scan lines and two adjacent data lines, and thin film transistor disposed at intersection points of data line and scan line; gate terminal of thin film transistor connected to scan line, source terminal of thin film transistor connected to data line and drain terminal of thin film transistor connected to pixel electrode, wherein long side of pixel electrode being disposed in parallel with scan line, drain terminal of thin film transistor having extension part acting as repair line for scan line, extension part extending along direction parallel to scan line and an end of extension part away from thin film transistor partially overlapping scan line.

According to a preferred embodiment of the present invention, the extension part comprises a main part disposed in parallel with scan line and a bending part connected to an end of the main part away from thin film transistor, with the bending part extending towards scan line and partially overlapping scan line.

According to a preferred embodiment of the present invention, the bending part is connected to the main part perpendicularly.

According to a preferred embodiment of the present invention, the scan line is disposed with a bump part at an end close to extension part away from thin film transistor, with the bump part extending towards extension part and partially overlapping end part of extension part.

According to a preferred embodiment of the present invention, the bump part is connected to the scan line perpendicularly.

The present invention provides a liquid crystal display device, which comprises: a liquid crystal display panel and a backlight module, the backlight module being for supplying light source required for the liquid crystal display panel, and the liquid crystal display panel comprising: data lines, scan lines disposed in a crisscross manner with data lines, pixel electrode disposed within area formed by two adjacent scan lines and two adjacent data lines, and thin film transistor disposed at intersection points of data line and scan line; gate terminal of thin film transistor connected to scan line, source terminal of thin film transistor connected to data line and drain terminal of thin film transistor connected to pixel electrode, wherein long side of pixel electrode being disposed in parallel with scan line, drain terminal of thin film transistor having extension part acting as repair line for scan line, extension part extending along direction parallel to scan line and an end of extension part away from thin film transistor partially overlapping scan line.

According to a preferred embodiment of the present invention, the extension part comprises a main part disposed in parallel with scan line and a bending part connected to an end of the main part away from thin film transistor, with the bending part extending towards scan line and partially overlapping scan line.

According to a preferred embodiment of the present invention, the bending part is connected to the main part perpendicularly.

According to a preferred embodiment of the present invention, the scan line is disposed with a bump part at an end close to extension part away from thin film transistor, with the bump part extending towards extension part and partially overlapping end part of extension part.

According to a preferred embodiment of the present invention, the bump part is connected to the scan line perpendicularly.

The efficacy of the present invention is that to be distinguished from the state of the art. The present invention uses the extension part of the drain terminal of the thin film transistor as repair line for fixing broken scan line defect so as to improve yield rate and reduce manufacturing cost.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort, In the drawings.

DETAILED DESCRIPTION OF THE PREFERRED EMBODIMENTS

The following description refers to drawings and embodiments of the present invention.

Figure 1:
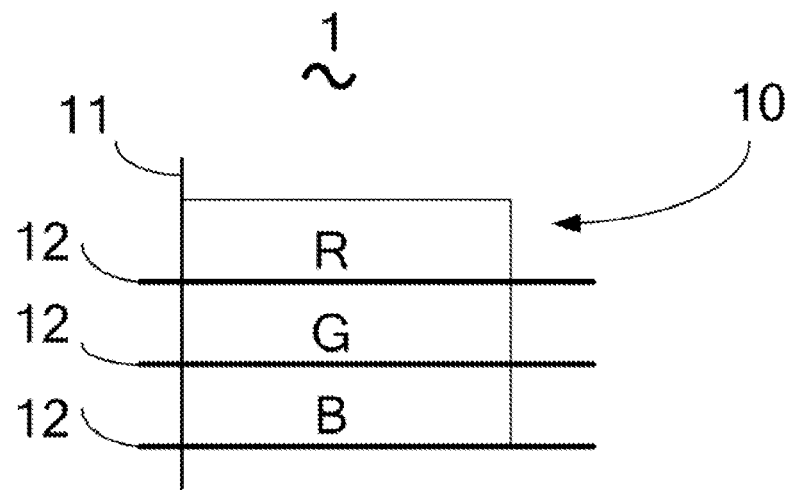
FIG. 1 is a schematic view showing the structure of pixel unit of a known liquid crystal display panel.
Figure 2:
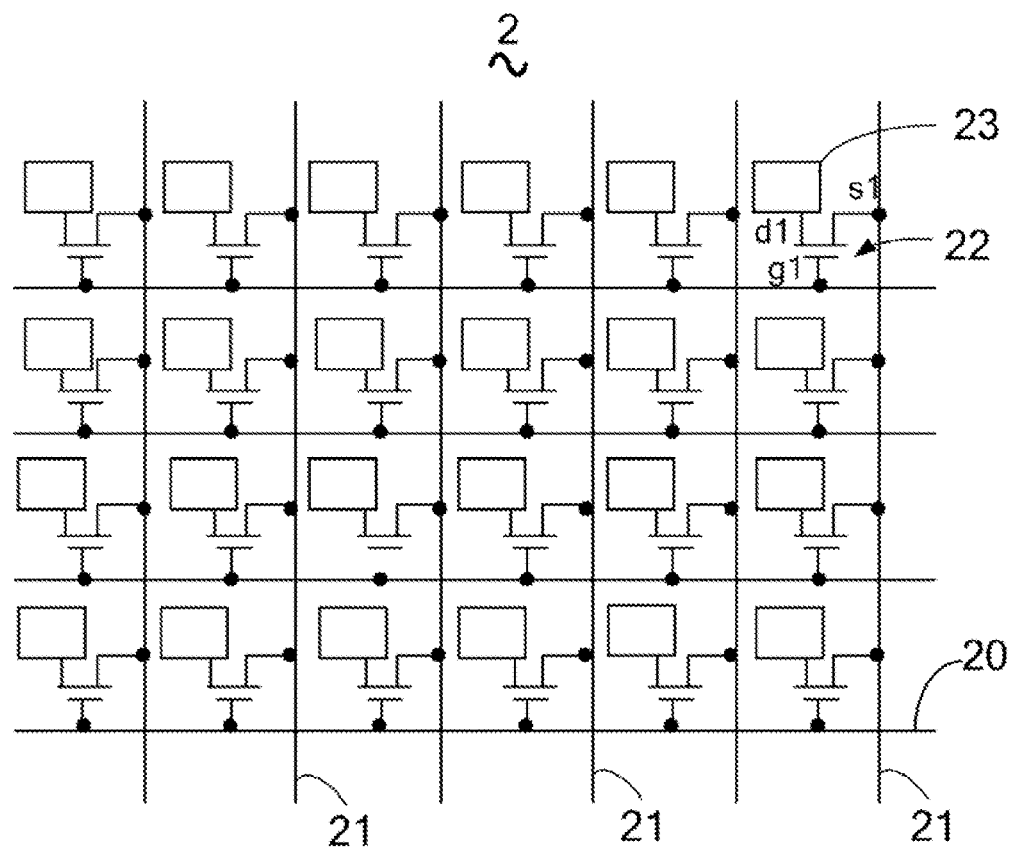
FIG. 2 is a schematic view showing the structure of the liquid crystal display panel of the present invention.

Referring to FIG. 2, FIG. 2 is a schematic view illustrating the structure of a preferred embodiment of liquid crystal display panel according to the present invention. As shown in FIG. 2, the liquid crystal display panel 2 according to the present invention comprises a plurality of data lines 21, a plurality of scan lines 20 disposed in a crisscross manner with data lines 21, pixel electrode 23 disposed within area formed by two adjacent scan lines 20 and two adjacent data lines 21, and thin film transistor 22 disposed at intersection points of data line 21 and scan line 20.

In the instant embodiment, gate terminal g1 of thin film transistor 22 is connected to scan line 20, source terminal s1 of thin film transistor 22 is connected to data line 21 and drain terminal d1 of thin film transistor 22 is connected to pixel electrode 23.

Figure 3:
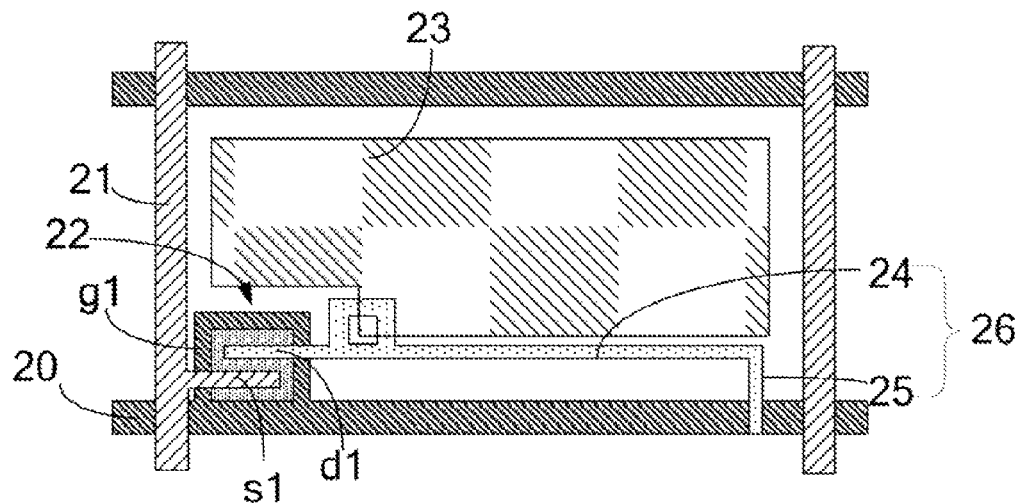
FIG. 3 is a schematic view showing the structure of pixel unit of the first embodiment of the liquid crystal display panel of the present invention.

Referring to FIG. 3, FIG. 3 is a schematic view showing the structure of pixel unit of the first embodiment of the liquid crystal display panel of the present invention. In this embodiment, a long side of pixel electrode 23 is preferably disposed in parallel with scan line 20. Drain terminal d1 of thin film transistor 22 has an extension part 26 acting as repair line for scan line 20. Extension part 26 extends along direction parallel to scan line 20 and an end of extension part 26 away from thin film transistor 22 partially overlaps scan line 20.

Specifically, extension part 26 comprises a main part 24 disposed in parallel with scan line 20 and a bending part 25 connected to an end of main part 24 away from thin film transistor 22. In the instant embodiment, main part 24 is preferably disposed in parallel with scan line 20. It should be understood that in other embodiments, main part 24 can also be disposed not in parallel with scan line 20.

In the instant embodiment, bending part 25 extends towards scan line 20 and partially overlaps scan line 20. In the instant embodiment, bending part 25 is preferably connected to main part 24 perpendicularly. It should be understood that in other embodiments, bending part 25 can also be connected to main part 24 in a non-perpendicular disposition.

Also, in the instant embodiment, bending part 25 does not extend beyond scan line 20 where bending part 25 overlaps scan line 20. It should be understood that in other embodiments, bending part 25 can extend beyond scan line 20 where bending part 25 overlaps scan line 20.

Figure 4:
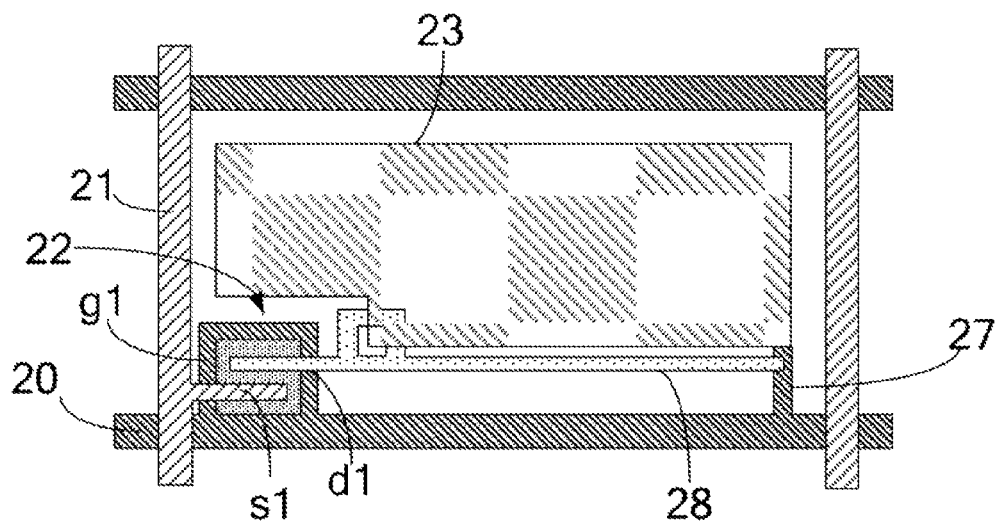
FIG. 4 is a schematic view showing the structure of pixel unit of the second embodiment of the liquid crystal display panel of the present invention.

Referring to FIG. 4, FIG. 4 is a schematic view showing the structure of pixel unit of the second embodiment of the liquid crystal display panel of the present invention. In the instant embodiment, a long side of pixel electrode 23 is preferably disposed in parallel with scan line 20. Drain terminal d1 of thin film transistor 22 has an extension part 28 acting as repair line for scan line 20. Extension part 28 extends along direction parallel to scan line 20 and an end of extension part 28 away from thin film transistor 22 partially overlaps scan line 20. Scan line 20 is disposed with a bump part 27 at an end close to extension part 28 away from thin film transistor 22. Bump part 27 extends towards extension part 28 and partially overlaps end part of extension part 28.

In the instant embodiment, bump part 27 is preferably connected to scan line 20 perpendicularly. It should be understood that in other embodiments, bump part 25 can also be connected to scan line 20 in a non-perpendicular disposition.

Figure 5:
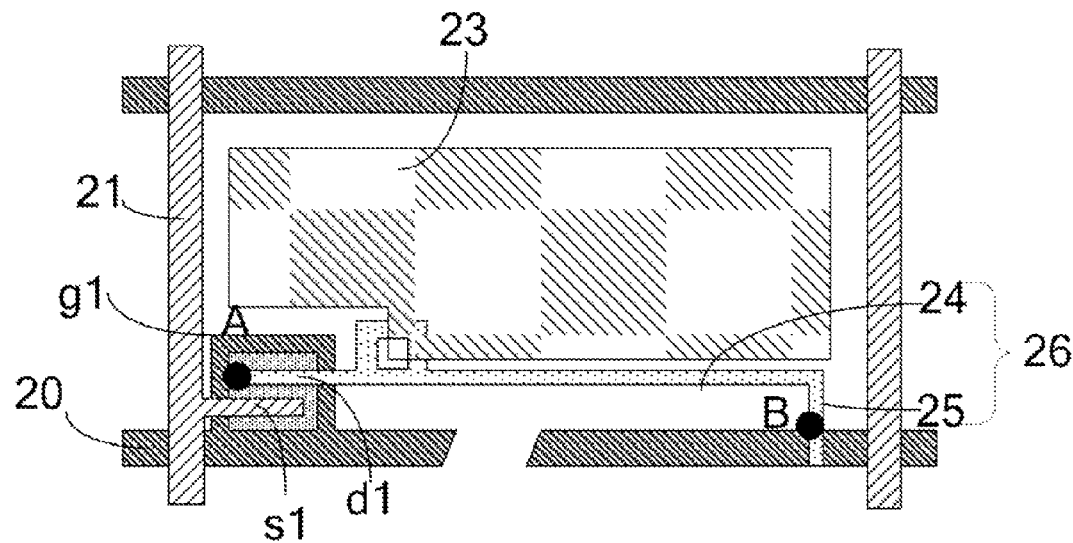
FIG. 5 is a schematic view showing the repair structure of broken scan line in the first embodiment of the liquid crystal display panel of the present invention.

Referring to FIG. 5, FIG. 5 is a schematic view showing the repair structure of broken scan line in the first embodiment of the liquid crystal display panel of the present invention. When scan line 20 is broken, a via hole is punched at point A where drain terminal d1 and gate terminal 91 of thin film transistor 22 overlap, and laser soldering is used to realize electrical connection between drain terminal d1 and gate terminal Also, a via hole is punched at point B where extension part 26 and scan line 20 overlap, and laser soldering is used to realize electrical connection between extension part 26 and scan line 20. Because gate terminal g1 and scan line 20 are electrically connected, the above disposition can realize electrical connection between two ends of scan line 20. Through the above electrical connections at point A and point B, the repair line between point A and point B can act as scan line to achieve the effect of fixing broken scan line.

Figure 6:
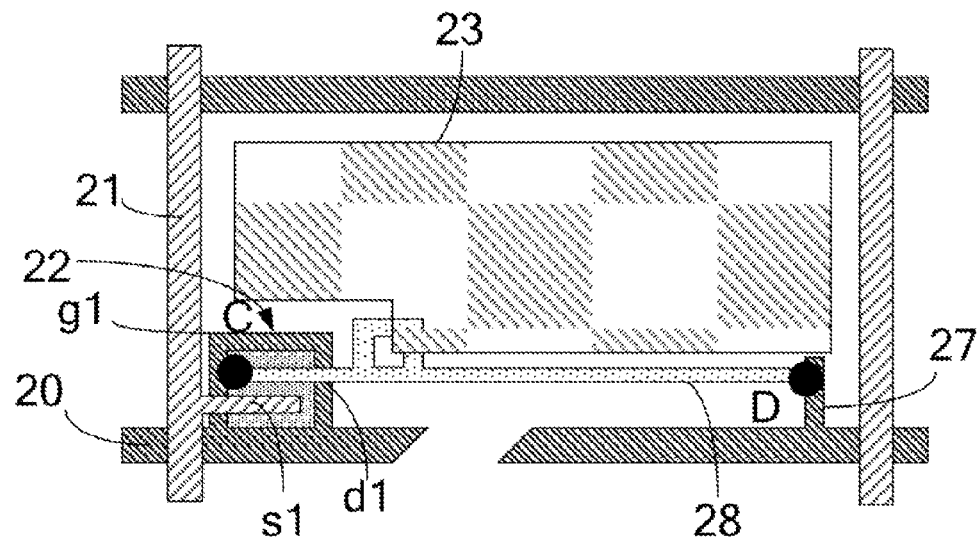
FIG. 6 is a schematic view showing the repair structure of broken scan line in the second embodiment of the liquid crystal display panel of the present invention.

Referring to FIG. 6, FIG. 6 is a schematic view showing the repair structure of broken scan line in the second embodiment of the liquid crystal display panel of the present invention. When scan line 20 is broken, a via hole is punched at point C where drain terminal d1 and gate terminal g1 of thin film transistor 22 overlap, and laser soldering is used to realize electrical connection between drain terminal d1 and gate terminal g1. Also, a via hole is punched at point D where extension part 28 and bump part 27 of scan line 20 overlap, and laser soldering is used to realize electrical connection between extension part 28 and bump part 27 of scan line 20. Because gate terminal g1 and scan line 20 are electrically connected, the above disposition can realize electrical connection between two ends of scan line 20. Through the above electrical connections at point C and point D, the repair line between point C and point D can act as scan line to achieve the effect of fixing broken scan line.

Figure 7:
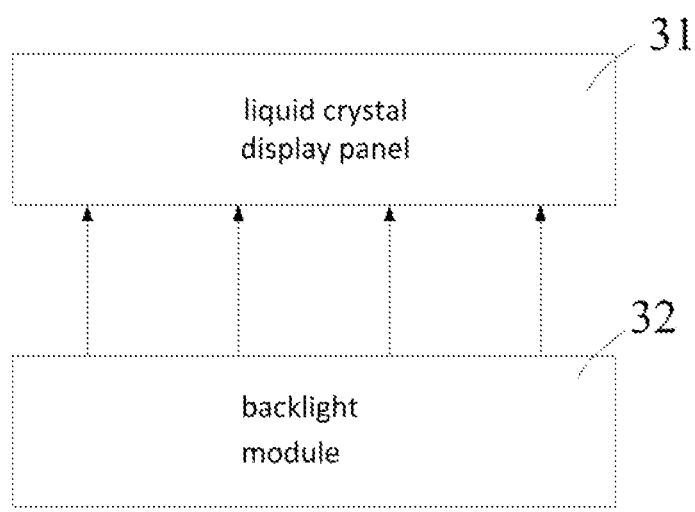
FIG. 7 is a schematic view showing the structure of the liquid crystal display device according to the present invention.

Furthermore, the present invention provides a liquid crystal display device. Referring to FIG. 7, FIG. 7 is a schematic view showing the structure of the liquid crystal display device according to the present invention. Liquid crystal display device 30 comprises a liquid crystal display panel 31 and a backlight module 32. Liquid crystal display panel 31 is any liquid crystal display panel of the above embodiment.

The efficacy of the present invention is that to be distinguished from the state of the art. The present invention uses the extension part of the drain terminal of the thin film transistor as repair line for fixing broken scan line defect so as to reconnect the two ends of scan line by laser soldering when scan line is broken, which leads to turning a defect of broken scan line to a connected scan line, improving yield rate and reducing manufacturing cost.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A liquid crystal display panel, which comprises: data lines, scan lines disposed in a crisscross manner with data lines, pixel electrode disposed within area formed by two adjacent scan lines and two adjacent data lines, and thin film transistor disposed at intersection points of data line and scan line; gate terminal of thin film transistor connected to scan line, source terminal of thin film transistor connected to data line and drain terminal of thin film transistor connected to pixel electrode;

wherein long side of pixel electrode being disposed in parallel with scan line, drain terminal of thin film transistor having extension part acting as repair line for scan line, extension part extending along direction parallel to scan line and an end of extension part away from thin film transistor partially overlapping scan line;

the extension part comprises a main part disposed in parallel with scan line and a bending part connected to an end of the main part away from thin film transistor, with the bending part extending towards scan line and partially overlapping scan line.

2. The liquid crystal display panel as claimed in claim 1, characterized in that the bending part is connected to the main part perpendicularly.

3. The liquid crystal display panel as claimed in claim 1, characterized in that the scan line is disposed with a bump part at an end close to the extension part away from thin film transistor, with the bump part extending towards the extension part and partially overlapping end part of the extension part.

4. The liquid crystal display panel as claimed in claim 3, characterized in that the bump part is connected to the scan line perpendicularly.

5. A liquid crystal display device, which comprises: a liquid crystal display panel and a backlight module, the backlight module being for supplying light source for the liquid crystal display panel, the liquid crystal display panel comprises:

data lines, scan lines disposed in a crisscross manner with data lines, pixel electrode disposed within area formed by two adjacent scan lines and two adjacent data lines, and thin film transistor disposed at intersection points of data line and scan line; gate terminal of thin film transistor connected to scan line, source terminal of thin film transistor connected to data line and drain terminal of thin film transistor connected to pixel electrode;

wherein long side of pixel electrode being disposed in parallel with scan line, drain terminal of thin film transistor having extension part acting as repair line for scan line, extension part extending along direction parallel to scan line and an end of extension part away from thin film transistor partially overlapping scan line;

the extension part comprises a main part disposed in parallel with scan line and a bending part connected to an end of the main part away from thin film transistor, with the bending part extending towards scan line and partially overlapping scan line.

6. The liquid crystal display panel as claimed in claim 5, characterized in that the bending part is connected to the main part perpendicularly.

7. The liquid crystal display panel as claimed in claim 5, characterized in that the scan line is disposed with a bump part at an end close to extension part away from thin film transistor, with the bump part extending towards the extension part and partially overlapping end part of the extension part.

8. The liquid crystal display panel as claimed in claim 7, characterized in that the bump part is connected to the scan line perpendicularly.

\* \* \* \* \*